(12) United States Patent
Rosenfellner

(10) Patent No.: US 6,221,126 B1
(45) Date of Patent: Apr. 24, 2001

(54) ARRANGEMENT AND PROCESS FOR THE REDUCTION OF METAL-OXIDE-BEARING MATERIAL

(75) Inventor: Gerald Rosenfellner, St. Peter/Au (AT)

(73) Assignee: Voest-Alpine Industrieanlagenbau GmbH, Linz (AT)

( * ) Notice: Subject to any disclaimer, the term of this patent is extended or adjusted under 35 U.S.C. 154(b) by 0 days.

(21) Appl. No.: 09/205,439

(22) Filed: Dec. 4, 1998

(30) Foreign Application Priority Data

Dec. 5, 1997 (AT) .................................................. 2074/97

(51) Int. Cl.$^7$ .................................................. C21B 13/02
(52) U.S. Cl. .................................................. 75/433; 75/489
(58) Field of Search .............................. 75/414, 433, 489

(56) References Cited

U.S. PATENT DOCUMENTS

| | | | |
|---|---|---|---|
| 3,850,616 | 11/1974 | Cruse, Jr. ................................. | 75/34 |
| 4,178,151 | 12/1979 | Huestis ..................................... | 432/1 |
| 4,205,831 | * 6/1980 | Vera et al. ............................... | 266/195 |
| 4,212,452 | 7/1980 | Hsieh ...................................... | 266/156 |
| 4,248,626 | 2/1981 | Scarlett et al. .......................... | 75/38 |
| 4,270,740 | 6/1981 | Sanzenbacher et al. ............. | 266/157 |
| 4,735,653 | 4/1988 | Mathews .................................. | 75/35 |
| 5,618,032 | * 4/1997 | Meissner et al. ...................... | 266/80 |

FOREIGN PATENT DOCUMENTS 3432090   3/1986   (DE) .

* cited by examiner

Primary Examiner—Melvyn Andrews
(74) Attorney, Agent, or Firm—Ostrolenk, Faber, Gerb & Soffen, LLP

(57) ABSTRACT

Arrangement for the reduction of metal-oxide-bearing material, particularly of, iron ore, with a reduction vessel in which the metal-oxide-bearing material is reduced in counterflow with reduction gas and which is provided with an inlet for metal-oxide-bearing material, an inlet for reduction gas, an outlet for off-gas and an outlet for reduced material, a vessel for metal-oxide-bearing material, which is connected with the reduction vessel by means of a line and a first supply line for a sealing gas which serves to seal the reduction vessel against the vessel, which first supply line is provided at the connecting line between the vessel and the reduction vessel, characterized in that at least one additional supply line for a sealing gas is provided at the connecting line, which additional supply line is located between the first supply line and the vessel.

10 Claims, 4 Drawing Sheets

ARRANGEMENT AND PROCESS FOR THE REDUCTION OF METAL-OXIDE-BEARING MATERIAL

BACKGROUND OF THE INVENTION

The invention relates to an arrangement for the reduction of metal-oxide-bearing material, particularly of iron ore, with a reduction vessel, for example, a shaft furnace, in which the metal-oxide-bearing material is reduced in counterflow with reduction gas and which is provided with an inlet for metal-oxide-bearing material, an inlet for reduction gas, an outlet for off-gas and an outlet for reduced material, a vessel for metal-oxide-bearing material which is connected with the reduction vessel by means of a line, and a first supply line for sealing gas which serves to seal the reduction vessel against the vessel, which first supply line is provided at the connecting line between the vessel and the reduction vessel.

Arrangements of this type are known (Direct from Midrex, Vol. 14, No. 4, 3rd quarter of 1989).

According to DE-A-34 32 090, sulfur-bearing ore is reduced in a shaft furnace in counterflow with reduction gas. The off-gas exiting the furnace is divided into two flows, the first flow being used for preheating and desulfurization of the ore which is located in an ore bin above the shaft furnace and then fed to an overall converter for heating purposes and the second flow being fed together with hydrocarbons to a catalytic gas converter for the purpose of generating reduction gas.

Above the ore bin of the arrangement described in DE-A-34 32 090, a container is located from which ore is charged into the ore bin. Inert gas is injected into the connection between this container and the ore bin in order to prevent sulfur-bearing off-gas from exiting the ore bin through this connection. This measure thus serves to establish a gas seal.

A shaft furnace for the reduction of metal-oxide-bearing material which is charged from an ore bin into the shaft furnace by means of downpipes is also known from U.S. Pat. No. 4,178,151.

U.S. Pat. No. 4,212,452 describes a plant in which iron oxide is reduced to sponge iron in a shaft furnace through the addition of solid carbon-bearing material which is gasified in an upper zone of the shaft furnace and through the addition of reduction gas containing CO and $H_2$ in a central zone of the shaft furnace. The iron oxide, together with the solid carbon-bearing material, is charged from the top into the shaft furnace and flows through the shaft furnace from the top to the bottom partly cocurrently and partly countercurrently to the reduction gases. In a lower zone of the shaft furnace, the sponge iron formed by reduction is cooled with cool, dry reduction gas. The shaft furnace is sealed towards the top and bottom with one $CO_2$-operated gas seal each in order to prevent the undesirable excape of reduction gas from the shaft furnace, $CO_2$ being recovered therein from waste reduction gas through gas scrubbing. This known arrangement has the disadvantage that the sealing gas, $CO_2$, may enter the shaft furnace, which is undesirable with regard to reduction.

An arrangement which is used, for example, for the direct reduction of iron-oxide-bearing material by means of reduction gas in a shaft furnace is known from U.S. Pat. No. 3,850,616. The iron-oxide-bearing material flows through the shaft furnace from the top to the bottom countercurrently to the reduction gas and is cooled with cool reduction gas in the lower zone of the shaft furnace. In order to prevent reduction gas from exiting the shaft furnace, a gas seal operated with inert gas is provided at the lower end of the shaft furnace. This known arrangement has the disadvantage of high consumption of expensive inert gas.

Processes in which iron-oxide-bearing material is reduced in a shaft furnace by means of reduction gas and melted in a melting unit which is structurally connected with the shaft furnace are known from U.S. Pat. Nos. 4,248,626 and 4,270,740. In the melting unit, reduction gas is generated by coal gasification. The reduction gas is withdrawn from the melting unit and cooled before it is charged into the shaft furnace in order to prevent the material reduced in the shaft furnace from agglomerating.

In order to prevent the very hot reduction gas from being carried over from the melting unit directly into the shaft furnace, a gas seal is provided in the direct connection between the melting unit and the shaft furnace.

The applicant further knows that gas seals operated with nitrogen, which seal shaft furnaces against the environment, are customary. Gas seals of this type have the disadvantage that the generation of nitrogen involves high technical expenditure, which results in high costs because large amounts of nitrogen are consumed.

The technical problem of the present invention is to eliminate this disadvantage and to provide an arrangement of the type described above which can be operated with a less expensive sealing gas.

SUMMARY OF THE INVENTION

The invention is characterized in that at an arrangement for the reduction of metal-oxide-bearing material, particularly of iron ore, with a reduction vessel in which the metal-oxide-bearing material is reduced in counterflow with reduction gas and which is provided with an inlet for metal-oxide-bearing material, an inlet for reduction gas, an outlet for off-gas and an outlet for reduced material, a vessel for metal-oxide-bearing material which is connected with the reduction vessel by means of a line and a first supply line for a sealing gas which serves to seal the reduction vessel against the vessel, which first supply line is provided at the connecting line between the vessel and the reduction vessel, at least one additional supply line for a sealing gas is provided at the connecting line, which additional supply line is located between the first supply line and the vessel.

Thus, at least one additional gas seal is provided in the arrangement according to the invention, which does not have to be inert to the reactions occurring in the reduction vessel and thus can be a less expensive gas. This gas assumes the function of the main sealing gas. The other gas seal, which is operated with a gas that is inert to the reactions occurring in the reduction vessel, for example, nitrogen or carbon dioxide, assumes the function of an auxiliary gas seal and moreover prevents the main sealing gas from entering the reduction vessel. In this way, considerably less inert gas is consumed than required according to prior art.

In the arrangement according to the invention, the line connecting the vessel with the reduction vessel preferably comprises a sealing leg and downpipes, the supply lines for sealing gas being provided at the sealing leg.

Off-gas from the reduction vessel can be used for operating the main gas seal. In this case, the outlet for off-gas is connected with the sealing leg by means of a line and a burner for the combustion of off-gas and a cooling device, for example, a heat exchanger or a scrubber, for cooling the off-gas combusted in the burner are provided in the arrangement according to the invention. Furthermore, a compressor is expediently provided, which is connected downstream of the cooling device.

Another preferred embodiment of the arrangement according to the invention is characterized in that an additional sealing leg is provided at the reduction vessel, which is located at the lower end of the reduction vessel, and in that at least two additional supply lines for sealing gas are provided at the sealing leg, one of which is connected with the first supply line for off-gas. In this case, it is expedient to provide a cooling device in the supply line.

The invention further relates to a process for the reduction of metal-oxide-bearing material, particularly of iron ore, with reduction gas in a reduction vessel, the metal-oxide-bearing material being charged from a vessel into the reduction vessel and conveyed through the latter in counterflow with the reduction gas, wherein the reduction vessel is sealed against the vessel by means of a first gas seal, which is operated with a first gas which is inert to the reduction of the metal-oxide-bearing material, which process is characterized in that at least one additional gas seal, which is located between the first gas seal and the vessel, is operated with an additional gas.

This at least one additional gas seal can be operated with an oxygenous gas, with air or with off-gas from the reduction vessel. Before being used as sealing gas, the off-gas can be treated in order to reduce the oxygen content, particularly combusted, and subsequently is expediently cooled. The off-gas used as sealing gas has an oxygen content of preferably max. 3 volume percent.

Another preferred embodiment of the process according to the invention is characterized in that at least two gas seals are also provided at the lower end of the reduction vessel, which are operated with off-gas or inert gas.

DESCRIPTION OF THE PREFERRED EMBODIMENTS

Figure 1:
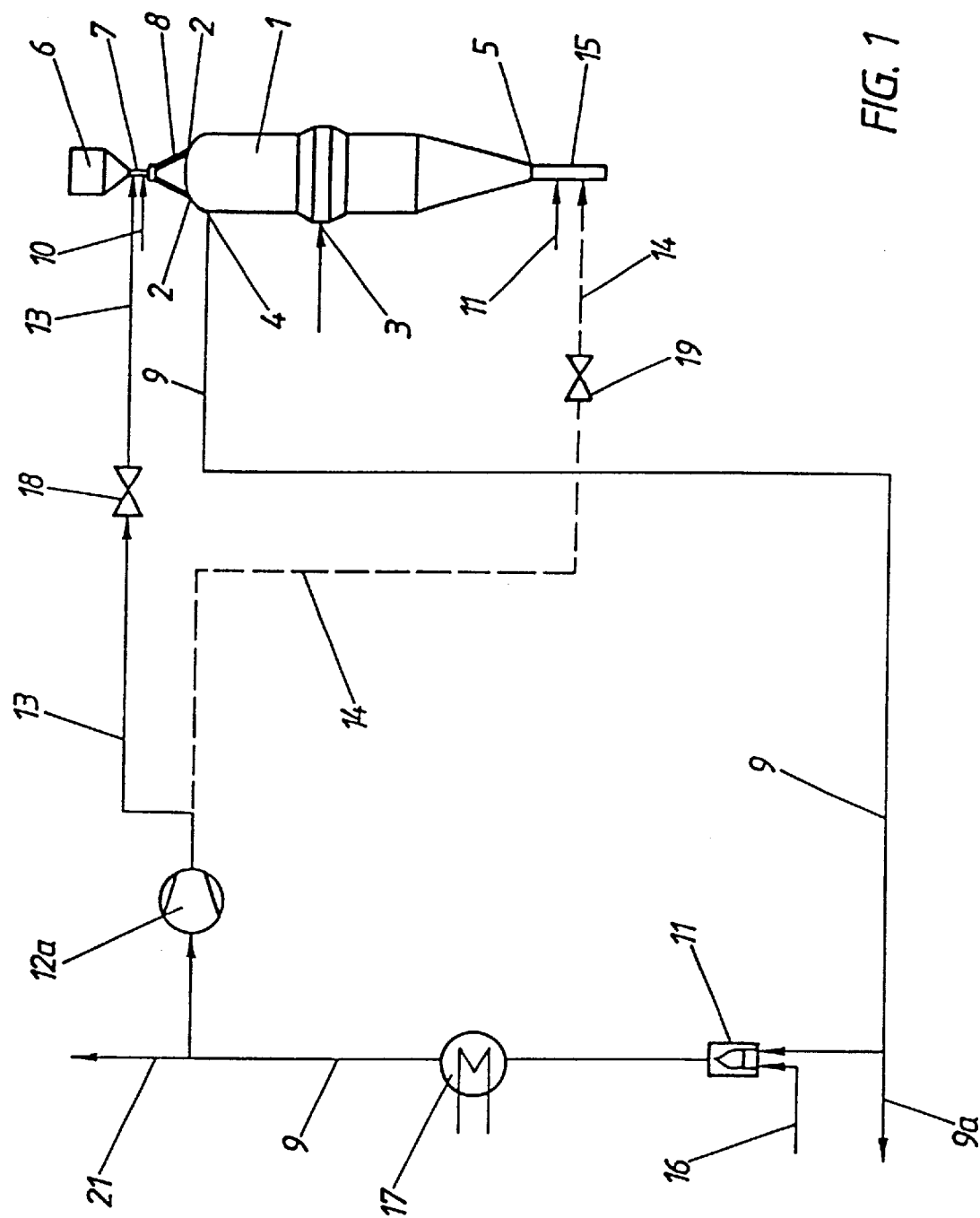
FIG. 1 diagrammatically illustrates an arrangement according to an embbbodiment of the present invention.

Preferred embodiments of the invention are described in greater detail in the drawing, where the same reference symbols are used to designate the same plant parts.

In FIG. 1, reference numeral 1 designates a conventional shaft furnace as reduction vessel for the reduction of iron ore which is conveyed from vessel 6, which represents an ore bin, through sealing leg 7 and downpipes 8 into shaft furnace 1.

Reduction gas is fed into the shaft furnace at inlet 3 and ascends in counterflow with the iron ore within shaft furnace 1. At the top, it exits shaft furnace 1 at outlet 4 in the form of off-gas (top gas) at a temperature of approx. 200–300° C. and is fed at least partly into post-combustion plant 11 through line 9, in which post-combustion plant 11 combustible constituents of the off-gas, such as $CO_1$ $H_2$ and $CH_4$, are combusted. Part of the waste reduction gas is discharged through line 9a, if required. Reference numeral 16 designates the supply of an oxygenous combustion gas, for example, air, to the post-combustion plant. Subsequently, the obtained gas, which has a temperature of approx. 1800° C., is cooled in cooling device 17 to a temperature of, for example, approx. 30° C. Cooling device 17 may be a heat exchanger, a scrubber, etc.

After passing through heat exchanger 17, part of the cooled combustion gas is discharged through line 21, and the remaining part is compressed (12a) and fed as sealing gas into upper sealing leg 7 through line 13 at a location. The gas temperature is slightly increased by compression, for example, to approx. 35° C., depending on cooling.

Reference numeral 10 designates a line for inert gas, for example, nitrogen or $CO_2$, which is used as additional sealing gas which is introduced at a location, as shown in the drawing, immediately above the first gas seal and immediately below the charging vessel.

Figure 2:
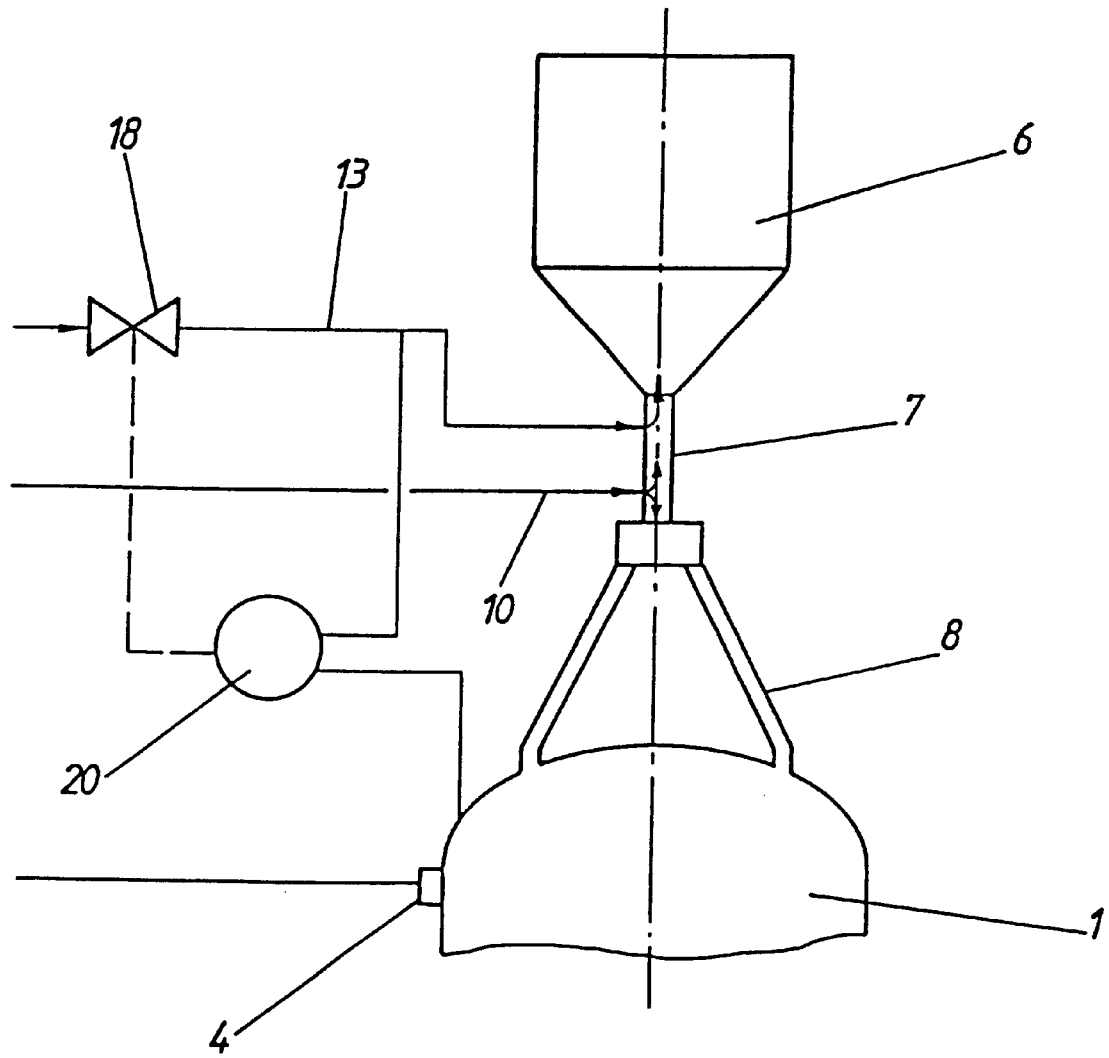
FIG. 2 diagrammatically illustrates, on an enlarged scale, part of the arrangement shown in FIG. 1.

The function of the gas seal according to the invention is explained in greater detail by means of FIG. 2. FIG. 2 displays part of FIG. 1 on an enlarged scale, the same reference symbols standing for the same plant parts.

The sealing gas used according to the invention, i.e. post-combusted off-gas, is pressed as main sealing gas into sealing leg 7 through line 13. The main sealing gas flows upwards in sealing leg 7 into ore bin 6 and thus seals shaft furnace 1 against the environment. In order to prevent main sealing gas from entering shaft furnace 1, nitrogen is pressed into sealing leg 7 through line 10 on the shaft furnace side, where it acts as an additional gas seal (auxiliary gas seal). The arrows in FIG. 2 indicate the direction of flow of nitrogen or of the sealing gas used according to the invention.

In order to seal shaft furnace 1 against the environment, the pressure in line 13 is adjusted to the pressure prevailing in the shaft furnace upstream of its junction with upper sealing leg 7 by differential pressure measurement in a way known to the specialist. This differential pressure measurement is indicated by reference numeral 20 in FIG. 2. It is obvious that the gas pressure in line 13, after passing by valve 18, must be higher than the pressure of the off-gas in the upper zone of shaft furnace 1. Pressure gauge 20 for measuring the differential pressure controls valve 18.

Additionally, the pressure in line 10 is set to a value ensuring that a local gas cushion builds up in sealing leg 7 which effectively prevents reduction gas from exiting shaft furnace 1 and main sealing gas from entering shaft furnace 1. This allows also oxygenous combustion gas to be used as main sealing gas, which means that during the combustion of off-gas in post-combustion plant 11 (FIG. 1) there is no need to make sure whether oxygen is contained in the post-combusted off-gas and that the technical expenditure on post-combustion can be reduced.

If combusted off-gas is also used as sealing gas for lower sealing leg 15 (FIG. 1), branch line 14 (indicated by a broken line) can lead from line 13 to lower sealing leg 15. In this case, however, the oxygen content of the sealing gas should be as low as possible since oxygen is to be prevented from entering shaft furnace 1.

In order to seal shaft furnace 1 at the lower sealing leg, the pressure in line 14 is adjusted to the pressure prevailing in the lower zone of shaft furnace 1 upstream of the junction with lower sealing leg 15 as described above by means of upper sealing leg 7.

After passing by valve 19, the gas pressure in line 14 must be higher than the pressure of the off-gas in the lower zone of shaft furnace 1.

Analogously to the upper sealing leg, line 11 for nitrogen is provided between line 14 and shaft furnace 1. Analogously to line 10, line 11 is also used as auxiliary gas seal and is to effectively prevent combusted off-gas used as main sealing gas from entering shaft furnace 1.

Figure 3:
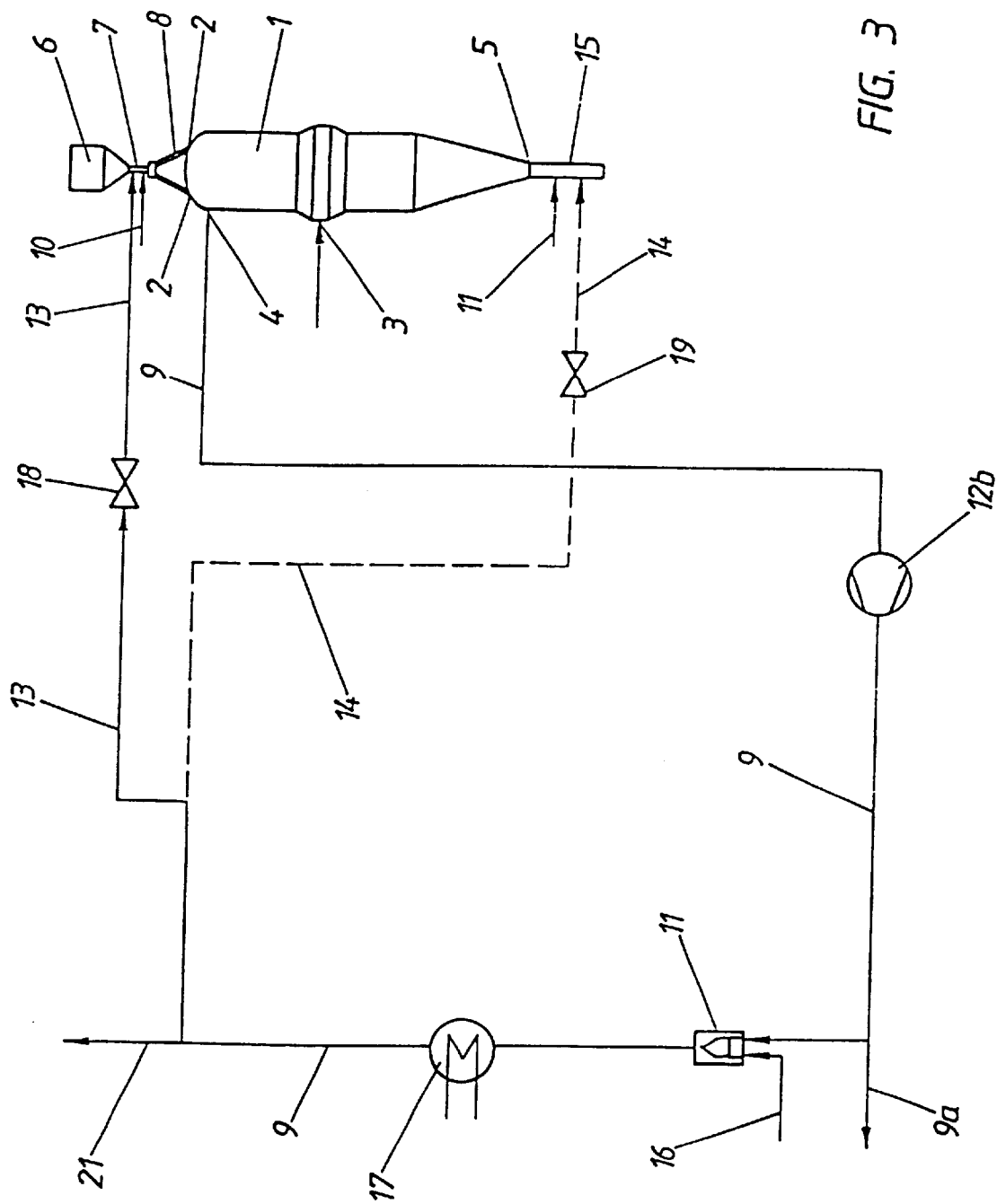
FIG. 3 diagrammatically illustrates an arrangement according to another embodiment of the present invention.

Another preferred embodiment of the process according to the invention is described by means of FIG. 3.

FIG. 3 displays a modification of the process described by means of FIG. 1. According to this embodiment, the off-gas (top gas) exiting shaft furnace 1 is compressed already upstream of post-combustion plant 11 (12b). In cooling device or scrubber 17, the combusted off-gas is only cooled to a temperature of 200–400° C. and used as sealing gas. Thus, heated sealing gas is used and ore contained in ore bin 6 can be preheated so that the capacity of shaft furnace 1 can be better utilized because the ore in shaft furnace 1 can be brought to reaction temperature at an earlier time. Moreover, rapid heating to reduction temperature has proved to be advantageous with regard to reduction.

If off-gas is also used as sealing gas for lower sealing leg 15, it should be previously cooled to a temperature of approx. 30–35° C. This is advantageously implemented in scrubber 22, which is provided in line 14.

Figure 4:
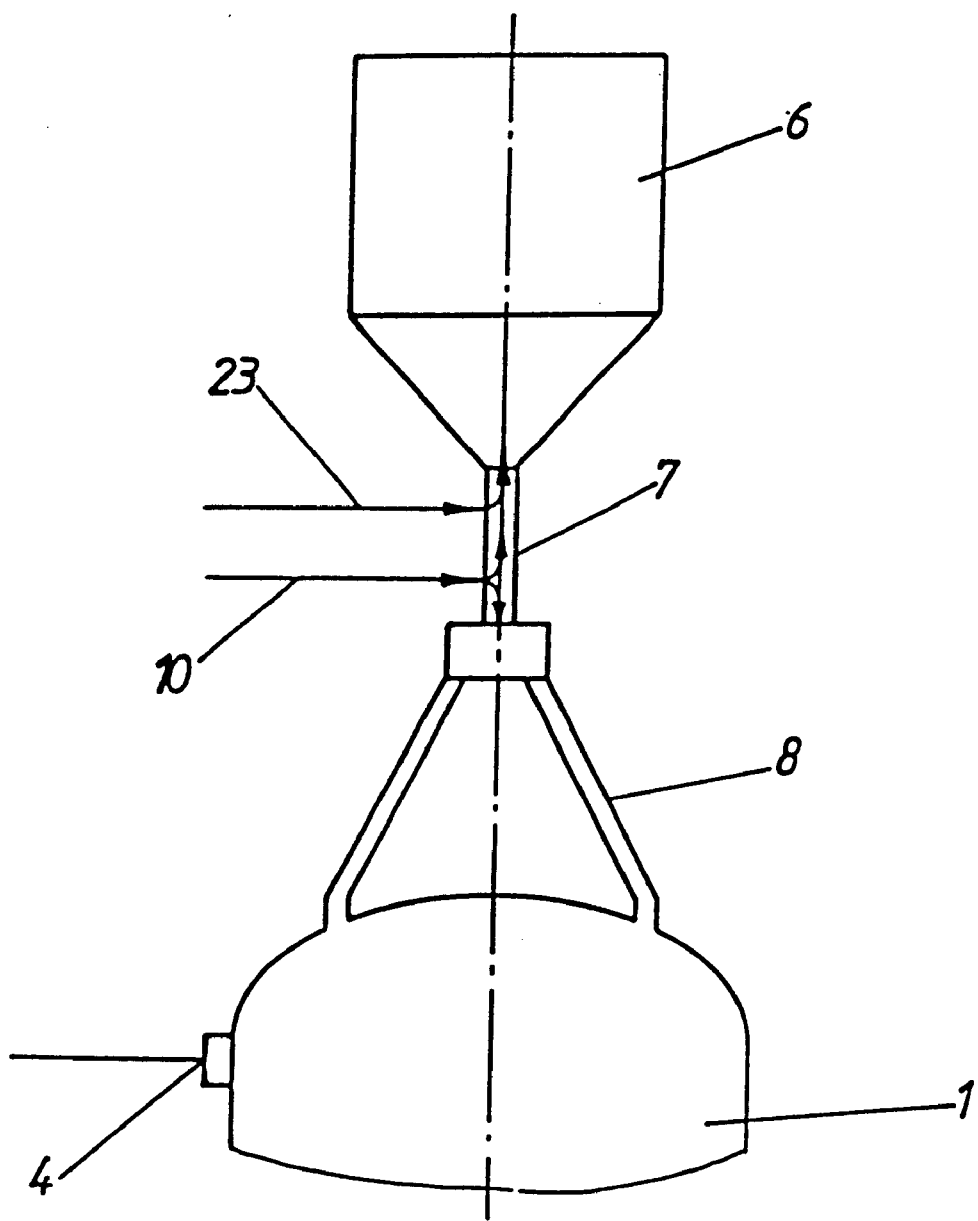
FIG. 4 diagrammatically illustrates an arrangement according to still another embodiment of the present invention.

Another embodiment of the process according to the invention is described by means of FIG. 4, which shows the upper zone of shaft furnace 1, whose interior is sealed with air instead of combusted off-gas against the environment.

Air is pressed into sealing leg 7 through line 23. Air used as sealing gas flows upwards in sealing leg 7 into ore bin 6, thus sealing shaft furnace 1 against the environment. In order to prevent air from entering shaft furnace 1, nitrogen is pressed into sealing leg 7 through line 10 on the shaft furnace side, where it acts as additional gas seal.

The arrows in FIG. 2 indicate the direction of flow of nitrogen or of the sealing gas used according to the invention.

In order to seal shaft furnace 1 against the environment, i.e. against ore bin 6, the pressure in line 23 is adjusted to the pressure prevailing in shaft furnace 1 upstream of the junction with upper sealing leg 7 by differential pressure measurement in a way known to the specialist. It is obvious that the pressure of the air in line 23 must be higher than the pressure of the off-gas in the upper zone of shaft furnace 1.

Additionally, the pressure in line 10 is set to a value ensuring that a local gas cushion builds up in sealing leg 7, which effectively prevents air from entering shaft furnace 1.

What is claimed is:

1. Process for the reduction of metal oxide-bearing material with reduction gas in a reduction vessel (1), the metal-oxide-bearing material being charged from a charging vessel (6) into the reduction vessel (1) and conveyed through the latter in counterflow to the reduction gas, wherein the reduction vessel (1) is sealed against the charging vessel (6) by means of a first gas seal (10) employing a first gas that is inert to the reduction of the metal-oxide-bearing material, off gas from the reduction vessel being produced and withdrawn, said process comprising introducing at least one additional gas as a seal (13;23) at a location immediately above the first gas seal (10) and immediately below the charging vessel (6).

2. Process according to claim 1, wherein said additional gas is an oxygenous gas.

3. Process according to claim 2, wherein said oxygenous gas is air.

4. Process according to claim 1, wherein said additional gas is the off-gas from the reduction vessel.

5. Process according to claim 4, wherein the off-gas is subjected to treatment in order to reduce the oxygen content before said off-gas is used as sealing gas.

6. Process according to claim 5, wherein said treatment is combustion, and the combusted gas is cooled after combustion.

7. Process according to claim 1, wherein at least two further sealing gases (11;14) are introduced at the lower end of the reduction vessel (1), said sealing gases being off-gas or inert gas.

8. Process according to claim 2, wherein said oxygenous gas has a maximum oxygen content of 3 volume percent.

9. Process according to claim 1, wherein the metal oxide bearing material is iron ore.

10. Process according to claim 5, wherein said treatment is combustion.

* * * * *